US006788529B2

(12) United States Patent
Homer et al.

(10) Patent No.: US 6,788,529 B2
(45) Date of Patent: Sep. 7, 2004

(54) PORTABLE COMPUTER HAVING MULTIPORT BAY

(75) Inventors: Steven S. Homer, Tomball, TX (US);
Ronald E. DeLuga, Spring, TX (US);
Michele Bovio, Castellamonte 18 (IT);
Mark Ruch, Woodlands, TX (US);
Phillip Prestigomo, Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/126,327

(22) Filed: Apr. 19, 2002

(65) Prior Publication Data

US 2003/0198009 A1 Oct. 23, 2003

(51) Int. Cl.[7] .................................................. G06F 1/16
(52) U.S. Cl. ........................ 361/683; 361/686; 361/754; 361/756; 312/223.2; 439/620
(58) Field of Search ................................. 361/674–686; 312/223.1, 223.2; 439/620, 676, 76.1, 856, 83, 629; 301/756, 741, 754

(56) References Cited

U.S. PATENT DOCUMENTS

| 6,017,106 | A | * | 1/2000 | Adams et al. ........... 312/223.2 |
| 6,178,087 | B1 | * | 1/2001 | Cho et al. .................... 361/686 |
| 6,525,932 | B1 | * | 2/2003 | Ohnishi et al. ............. 361/686 |
| 6,547,597 | B2 | * | 4/2003 | Harris, IV .................. 439/620 |
| 2003/0137805 | A1 | * | 7/2003 | Wu ............................. 361/686 |

* cited by examiner

*Primary Examiner*—Lisa Lea-Edmonds

(57) ABSTRACT

A portable computer having an external bay with a multiport connector. The portable computer comprises a base coupled to a display module. The display module has a backcover with a bay area for receiving a variety of electronic device modules.

30 Claims, 5 Drawing Sheets

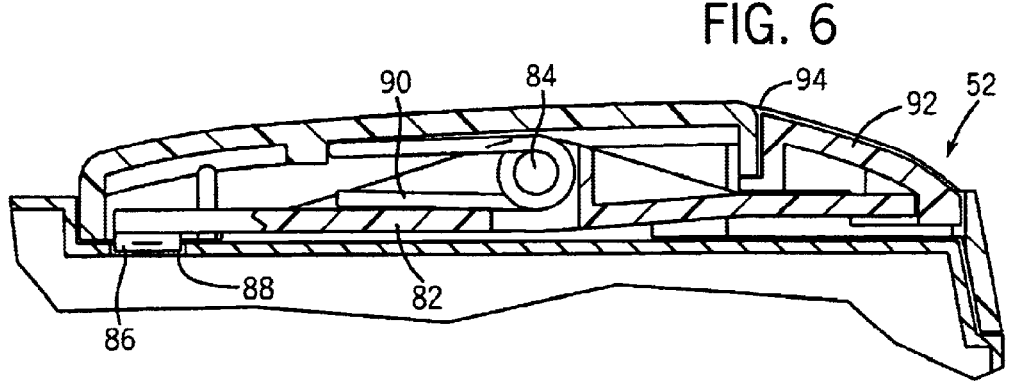
FIG. 6
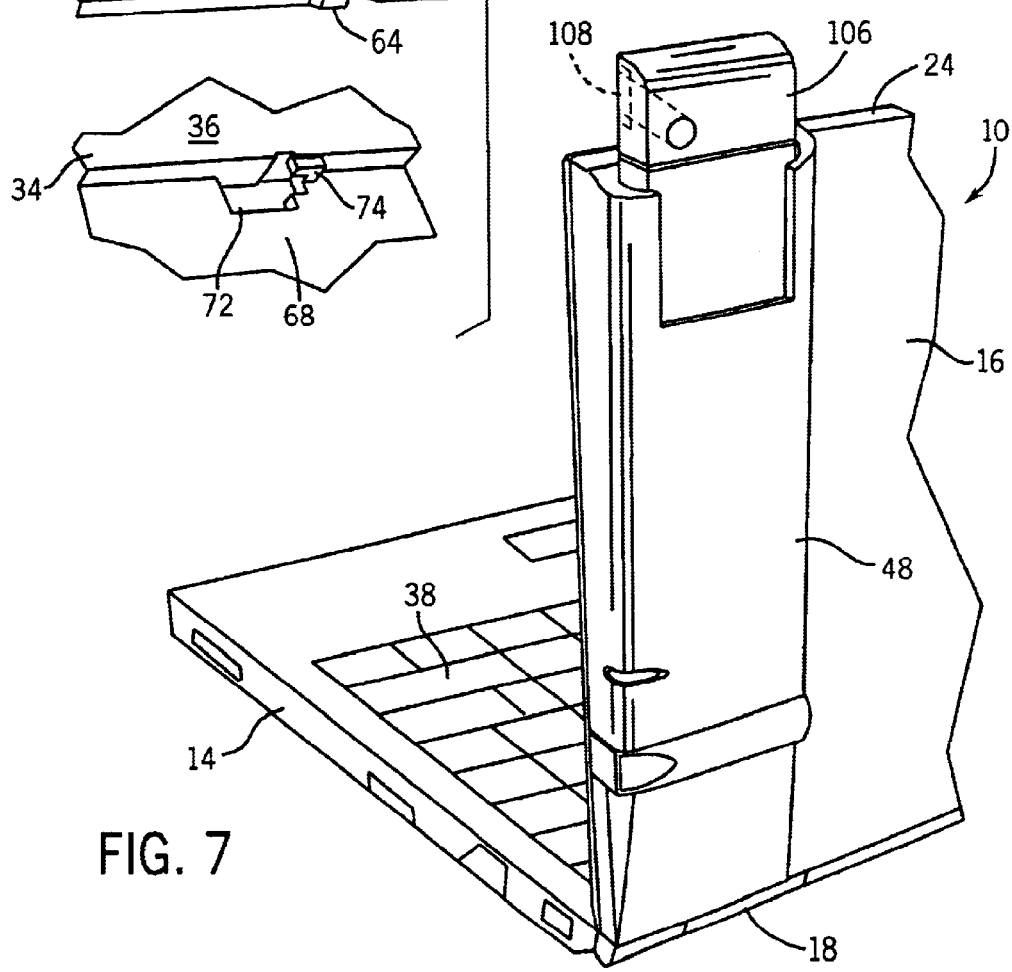
FIG. 5
FIG. 7

PORTABLE COMPUTER HAVING MULTIPORT BAY

FIELD OF THE INVENTION

The invention generally relates to portable computers, such as notebook computers, and particularly to a multiport bay to which a variety of modules or devices can be attached.

BACKGROUND OF THE INVENTION

Portable computers utilize a variety of connectors and internal bays for attaching certain electronic devices. For example, PCMCIA card slots can be used to attach devices for performing desired additional functions. In existing systems, the available space often limits the size and/or shape of any electronic device modules that may be attached to the computer. Additionally, internal bays tend to be constrained by shielding within the system which has a limiting effect on the ability to optimize antenna reception.

SUMMARY OF THE INVENTION

The present invention relates generally to a portable computer system that comprises a display panel having a backcover. A multiport connection bay is incorporated into the backcover to permit selective attachment of desired modules having a variety of functionality. The bay is unconstrained in the Z direction which extends outwardly from the back panel. Thus, modules having any of a variety of thicknesses may be utilized.

BRIEF DESCRIPTION OF THE DRAWINGS

The invention will hereafter be described with reference to the accompanying drawings, wherein like reference numerals denote like elements, and:

FIG. 5 is an enlarged view of portions of the region captured by dashed line 5—5 of FIG. 4;

FIG. 6 is a cross-sectional view taken generally along line 6—6 of FIG. 3; and

FIG. 7 is a perspective view of an alternate embodiment of the portable computer illustrated in FIG. 1.

DETAILED DESCRIPTION OF EXEMPLARY EMBODIMENTS

Figure 1:
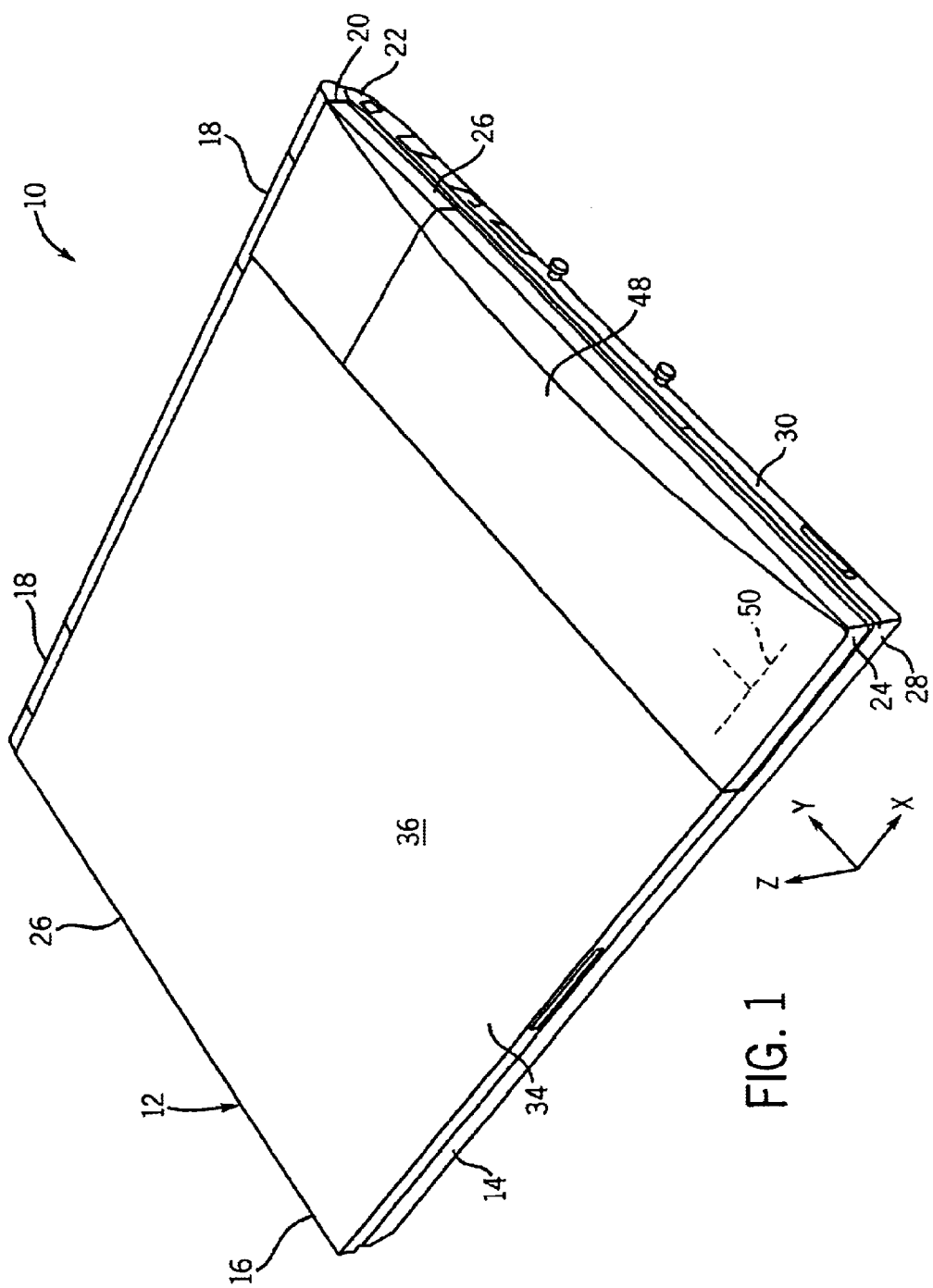
FIG. 1 is a perspective view of an exemplary portable computer, such as a notebook computer, according to one embodiment of the present invention.

Referring generally to FIG. 1, a portable computer system 10 is illustrated. Computer system 10 comprises a portable computer 12, such as a notebook computer, which has a base 14 coupled to a display panel 16. Display panel 16 may be connected to base 14 in a variety of ways and by various mechanisms. However, one exemplary mechanism comprises one or more hinges 18 disposed generally at a first end 20 of display panel 16 and a first end 22 of base 14.

Generally opposite first end 20, display panel 16 has a second end 24. A pair of side edges 26 extend between first end 20 and second end 24 to define the general perimeter of display panel 16. Similarly, base 14 has a second end 28 and a pair of side edges 30 that extend generally between first end 22 and second end 24 to define a perimeter of base 14.

Figure 2:
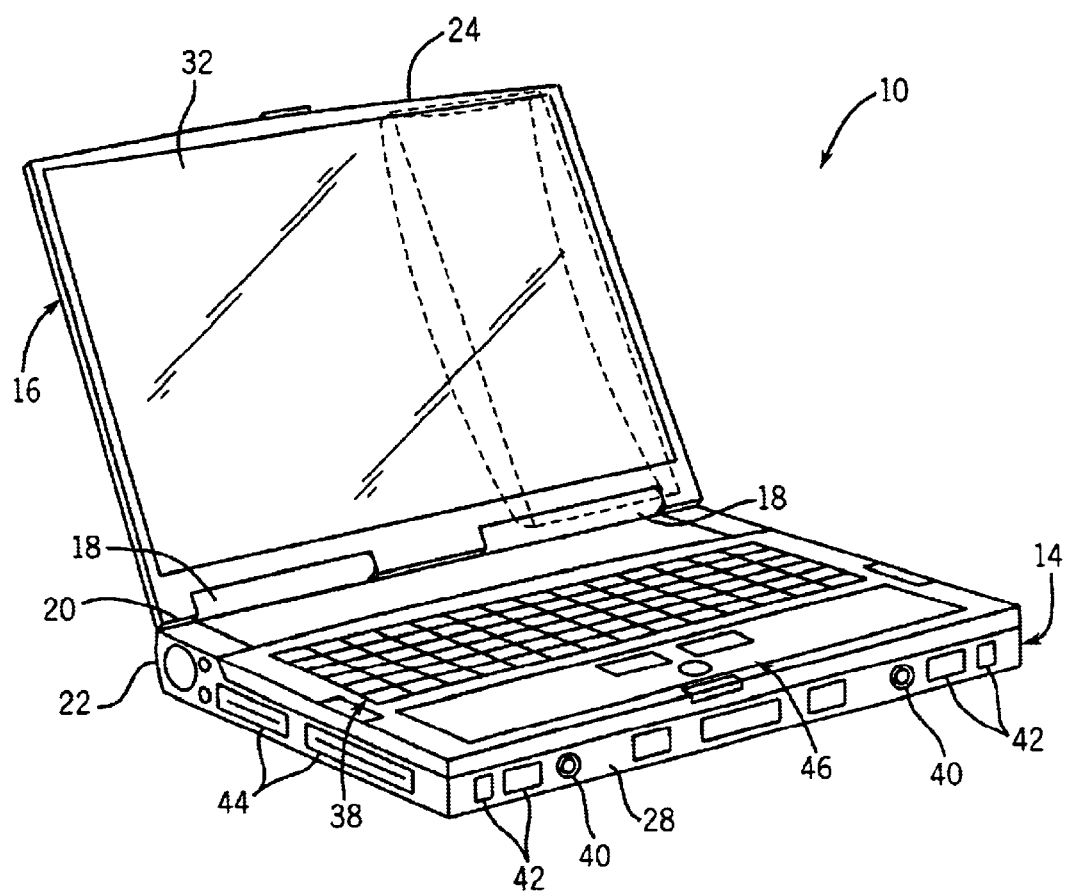
FIG. 2 is a perspective view of the portable computer of FIG. 1 with the display panel in an open position for use by an individual.

Hinge or hinges 18 allow display panel 16 to be pivoted between a closed position, as illustrated in FIG. 1, and an open position, as illustrated in FIG. 2. In the open position, a user is readily able to view a display screen 32 of display panel 16. In the open position, second end 24 is generally in an upward position relative to first end 20.

Opposite display screen 32, display panel 16 comprises a backcover 34 (see FIG. 1). In the exemplary embodiment, backcover 34 has a generally planar wall with an exterior surface 36. The exemplary backcover 34 lies substantially parallel with display screen 32 and may be formed from magnesium, a strong lightweight material. However, a variety of other materials, such as plastic and composite materials, may also be used in the formation of backcover 34.

Base 14 may include a keyboard 38, such as a removable keyboard to permit separation of the keyboard from the remainder of base 14. Additionally, base 14 includes or may include a variety of other features, such as interactive buttons 40, ports 42, drives 44, mouse pads 46 and other features that facilitate the use or adaptability of portable computer 12.

Portable computer system 10 also comprises a module 48 that is electrically and mechanically coupled to portable computer 12 via display panel 16. For example, module 48 may be connected to backcover 34 along exterior surface 36. In the embodiment illustrated in FIGS. 1 and 2, module 48 is mounted in a bay (discussed below) positioned along exterior surface 36 of backcover 34. Module 48 may, for example, be positioned to extend into the upper right hand corner of backcover 34 as determined from the perspective of a user when display panel 16 is in the open position.

Module 48 may be designed with one or more electronic devices for performing various functions. By mounting module 48 along exterior surface 36 of backcover 34, the module is unconstrained in the Z direction (see FIG. 1 in which the Z axis extends in a perpendicular direction with respect to exterior surface 36). Thus, multiple modules 48 with different thicknesses can readily be mounted to backcover 34.

In one exemplary system portable computer 12 maybe shipped with a simple cover similar to the outer shell of module 48 illustrated in FIG. 1. The cover is removable to permit the mounting of any of a variety of electronic device modules 48 to portable computer 12. This facilitates both the upgrading of modules as well as the interchange of a variety of different modules.

For example, because module 48 is mounted on the exterior of portable computer 12 and is not constrained by shielding, the design is readily adaptable for use with wireless communication devices or other devices that utilize an antennae 50. In the illustrated design, antennae 50 is disposed towards second end 24 of display panel 16. Thus, when display panel 16 is pivoted to its open or user position, as illustrated in FIG. 2, antennae 50 is disposed at a raised external location to facilitate reception and/or transmission.

Figure 3:
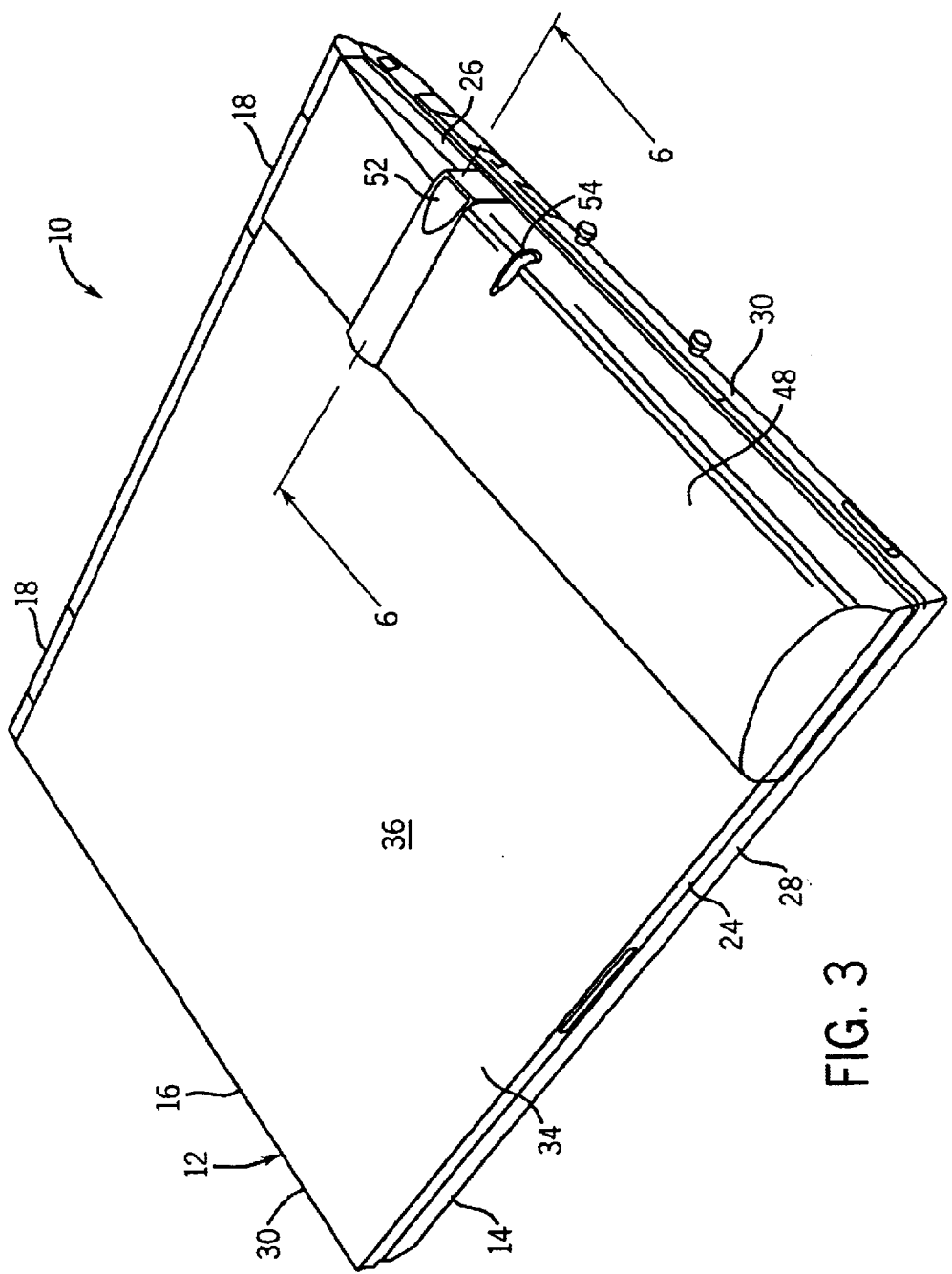
FIG. 3 is a perspective view of the back panel of the portable computer illustrated in FIG. 1 with an exemplary electronic device module attached.

As further illustrated in FIG. 3, module 48 may have a variety of forms, shapes and thicknesses. Also, the module may comprise a variety of electronic devices, such as communication modules, e.g. Bluetooth modules and 802.11 standard wireless modules, as well as a variety of other types of modules including biometrics reader modules and video cameras. The module 48 illustrated in FIG. 3 is representative of these various types of devices that can be incorporated into portable computer system 10.

A given module 48 may have a variety of other features, such as release latch 52 and an LED or other visual indicator 54. Release latch 52 is used to avoid inadvertent separation of module 48 from display panel 16, and indicator 54 can be used to indicate a variety of events, such as connection between module 48 and portable computer 12 or the actual operation of module 48.

Figure 4:
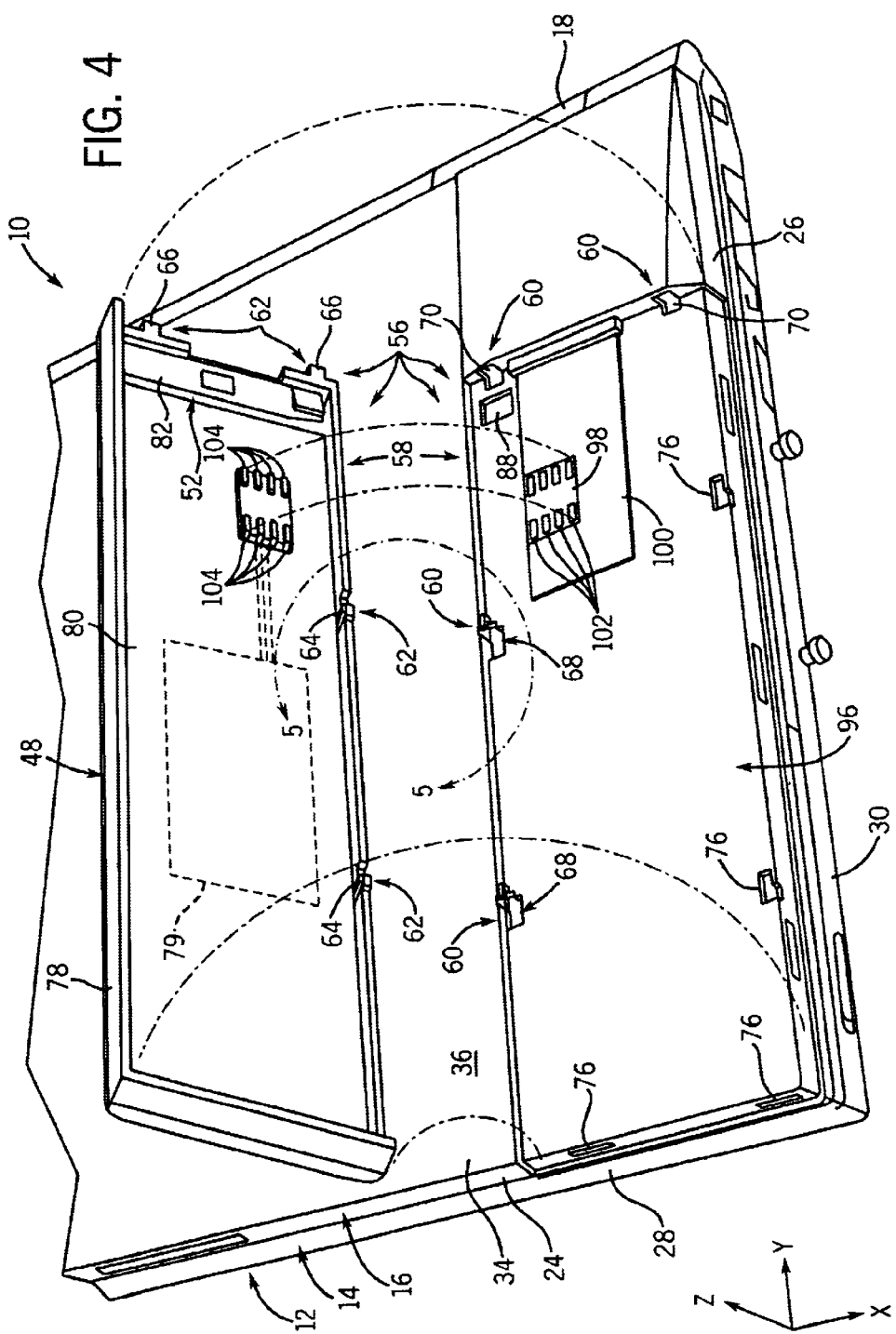
FIG. 4 is an exploded view of a portion of the portable computer illustrated in FIG. 3.

An exemplary mechanical interface 56 and electrical interface 58 is illustrated in FIG. 4. Mechanical interface 56 typically comprises a plurality of retention features 60 located in or on backcover 34 and corresponding retention features 62 formed as part of module 48. By way of specific example, corresponding retention features 62 comprise a plurality of hook members 64 (see also FIG. 5) and tabs 66. Hook members 64 and tabs 66 are received by retention features 60 and specifically by hook receptacles 68 and tab openings 70.

As illustrated best in FIG. 5, each hook receptacle 68 comprises a recess or opening 72 and a generally hook-shaped receiving portion 74. To attach module 48, hook members 64 are inserted into openings 72 and the module is slid laterally, e.g. in a Y direction, until hook members 64 engage hook-shaped receiving portions 74 to prevent movement of module 48 with respect to backcover 34 in a Z direction. Simultaneously, tabs 66 slide into tab openings 70 which further restrict movement and thus also help prevent inadvertent separation of module 48 from portable computer 12.

Depending on the required security of attachment, module weight, etc., additional retention features 76 can be added. Generally, the retention features are disposed at spaced locations in the X-Y plane to constrain the module in the X and Y directions while leaving the module thickness unconstrained in the Z direction.

The various retention features 62 of module 48 are attached to or formed as an integral part of an overall shell or housing structure 78. Housing structure 78 typically is formed of a relatively stiff material, such as a plastic material, that allows the forming, e.g. molding, of various retention features as integral portions of the overall housing structure 78. The housing structure 78 also functions to protect internal components of the module, such as various electronics 79 that may be provided on an appropriate printed circuit board 80. The actual internal components can vary substantially from one type of module to another, as would be known to those of ordinary skill in the art.

In at least some embodiments, inadvertent separation of module 48 from backcover 34 is further limited by release latch mechanism 52. An exemplary release latch mechanism 52 comprises a lever 82 pivotably mounted within housing structure 78, as illustrated best in FIGS. 4 and 6. Lever 82 may be pivotably connected to housing structure 78 by an appropriate pin 84 or other pivot structure. Lever 82 further comprises an engagement member 86 sized for receipt in a corresponding retention opening 88 formed in backcover 34. A spring 90 biases engagement member 86 into retention opening 88 when module 48 is attached to portable computer 12. Lever 82 further comprises a push button 92 exposed through an opening 94 of housing structure 78.

To release latch mechanism 52, the biasing force of spring 90 is overcome by applying a force against push button 92 until engagement member 86 is withdrawn from retention opening 88. Then, module 48 can be slid laterally and separated from backcover 34. In this manner, modules can be interchanged, repaired, upgraded or simply removed. The latch mechanism 52 and the various retention features provide a rugged mechanical interface between module 48 and portable computer 12 while permitting the easy interchange of modules.

Portable computer 12 is designed to create a panel bay 96 along exterior surface 36 of backcover 34 to facilitate this easy attachment and removal of desired modules at an external region of the computer also facilitates such functionality as reception and transmission of various wireless communications. Furthermore, the use of external panel bay 96 along backcover 34 promotes the ability to form a rugged mechanical interconnect between module 48 and portable computer 12. Panel bay 96 also provides flexibility in the design and formation of electrical interface 58.

For example, in the embodiment illustrated, panel bay 96 incorporates an electrical connector 98 disposed on an appropriate printed circuit card 100 electrically coupled with portable computer 12. One exemplary electrical connector 98 is a multiport USB connector, such as an 8-pin connector. In the configuration illustrated, electrical connector 98 comprises a plurality of connector pads 102 that are exposed along panel bay 96 for contact with corresponding contacts 104 of module 48. Corresponding contacts 104 are appropriately coupled to PC board 80 and protrude outwardly for contact with pads 102 when module 48 is coupled to backcover 34. By using connector pads 102 and protruding contacts 104, appropriate communicative contact between portable computer 12 and module 48 is formed when module 48 is moved into mechanical engagement with backcover 34 and slid laterally into its secured position.

Although a multiport USB interface works well for electrically coupling many types of modules 48 to portable computer 12, panel bay 96 may be designed to accommodate other or additional types of electrical interfaces. Additionally, the number of contacts or ports required or used can vary depending on the type of module, type of electrical interface and desired adaptability of the overall system.

Referring generally to FIG. 7, a modified embodiment of module 48 is illustrated in which the external form of the module has been changed to accommodate certain functionality. In this embodiment, module 48 further comprises an extended portion 106 that extends beyond the periphery of display panel 16. Specifically, portion 106 extends above second end 24. The use of such an extended portion 106 facilitates the use of, for instance, certain types of antennae or a video camera 108. In the embodiment illustrated, module 48 is a video camera module with video camera 108 disposed above display panel 16 to permit viewing of the computer system user.

It will be understood that the foregoing description is of exemplary embodiments of this invention, and that the invention is not limited to the specific forms shown. For example, the shape, texture and material of which the module housing structure is formed may vary; the electronics and functionality of modules can be substantially different depending on the particular device or devices incorporated into the module; the overall design of the portable computer, e.g. laptop, notebook, etc., is not limited; and the specific types of mechanical connectors as well as electrical connectors can vary according to application and design considerations. These and other modifications may be made in the design and arrangement of the elements without departing from the scope of the invention as expressed in the appended claims.

What is claimed is:

1. A portable computer system, comprising:
   a display panel having a display and a backcover with an exterior surface generally parallel with the display; and
   a USB connector disposed to form a connection along the exterior surface.

2. The portable computer system as recited in claim 1, wherein the USB connector comprises an eight pin connector.

3. The portable computer system as recited in claim 2, wherein the USB connector comprises a plurality of contact pads.

4. The portable computer system as recited in claim 1, wherein the USB connector comprises a plurality of contact pads.

5. The portable computer system as recited in claim 1, wherein the USB connector is disposed in a panel bay having a module connection feature.

6. The portable computer system as recited in claim 5, further comprising a module releasably mounted to the module connection feature.

7. The portable computer system as recited in claim 6, wherein the USB connector comprises a plurality of contact pads.

8. The portable computer system as recited in claim 7, wherein the module comprises electronics coupled to the USB connector via a plurality of protrusions that contact the plurality of contact pads when the module is mounted to the module connection feature.

9. The portable computer system as recited in claim 8, wherein the panel bay extends to an upper corner of the display panel when the display panel is in a normal viewing position.

10. The portable computer system as recited in claim 8, further comprising a base having a keyboard, the display panel being hingedly connected to the base.

11. The portable computer system as recited in claim 10, wherein the module comprises a Bluetooth module.

12. The portable computer system as recited in claim 10, wherein the module comprises a 802.11 standard wireless module.

13. The portable computer system as recited in claim 10, wherein the module comprises a biometrics reader module.

14. The portable computer system as recited in claim 10, wherein the module comprises a video camera.

15. The portable computer system as recited in claim 10, wherein the module comprises an antennae.

16. A portable computer system, comprising:
    a base;
    a display panel coupled to the base; and
    a multiport connector disposed on a backside of the display panel.

17. The portable computer system as recited in claim 16, wherein the multiport connector comprises a USB connector.

18. The portable computer system as recited in claim 16, wherein the base comprises a keyboard.

19. The portable computer system as recited in claim 16, wherein the display panel is hingedly connected to the base.

20. The portable computer system as recited in claim 17, wherein the USB connector comprises an eight pin connector.

21. The portable computer system as recited in claim 16, wherein the multicontact connector comprises a plurality of conductive pads.

22. The portable computer system as recited in claim 21, further comprising a module having a plurality of extended electrical contacts arranged to contact the plurality of conductive pads.

23. The portable computer system as recited in claim 22, wherein the module further comprises a mechanical retention feature to releasably secure the module to the backside of the display panel.

24. A computer system, comprising:
    a portable computer having a display panel and a plurality of interchangeable electronic modules, wherein each of the interchangeable modules is connectable to a connector disposed along a backcover of the display panel.

25. The computer system as recited in claim 24, wherein the connector comprises a USB connector.

26. The computer system as recited in claim 24, wherein the plurality of interchangeable modules vary in thickness measured along a line perpendicular to the backcover.

27. The computer system as recited in claim 24, wherein the plurality of interchangeable electronic modules comprise a communications module.

28. The computer system as recited in claim 24, wherein the plurality of interchangeable electronic modules comprise a wireless communications device.

29. The computer system as recited in claim 24, wherein the plurality of interchangeable electronic modules comprise a biometrics reader.

30. The computer system as recited in claim 24, wherein the plurality of interchangeable electronic modules comprise a video camera.

* * * * *